(12) United States Patent
Landrieve

(10) Patent No.: US 6,694,839 B1
(45) Date of Patent: Feb. 24, 2004

(54) NEUTRAL POINT SETTING FOR STEERING WHEEL IN PARTICULAR

(75) Inventor: Franck Landrieve, Fondettes (FR)

(73) Assignee: SKF France, Montigny le Bretonneux (FR)

( * ) Notice: Subject to any disclaimer, the term of this patent is extended or adjusted under 35 U.S.C. 154(b) by 0 days.

(21) Appl. No.: 09/959,154

(22) PCT Filed: Apr. 18, 2000

(86) PCT No.: PCT/FR00/00997

§ 371 (c)(1),
(2), (4) Date: Oct. 18, 2001

(87) PCT Pub. No.: WO00/63059

PCT Pub. Date: Oct. 26, 2000

(30) Foreign Application Priority Data

Apr. 19, 1999 (FR) ............................................. 99 04901

(51) Int. Cl.⁷ ................................................. B62D 1/16
(52) U.S. Cl. ........................................... 74/495; 74/470
(58) Field of Search ......................... 74/492, 491, 495, 74/493, 470; 280/771, 774, 775, 779, 89, 89.11; 180/400, 443, 444, 402; 267/150, 156, 154, 155

(56) References Cited

U.S. PATENT DOCUMENTS

| 2,075,567 A | * | 3/1937 | Benedek ...................... 280/89 |
| 2,656,178 A | | 10/1953 | Hughes, Jr. |
| 3,636,794 A | * | 1/1972 | Van Wicklin, Jr. ............. 74/495 |
| 3,796,292 A | * | 3/1974 | Harrison ................. 192/223.4 |
| 4,246,991 A | * | 1/1981 | Oldakowski ............. 192/223.4 |
| 4,651,854 A | * | 3/1987 | Harada ..................... 192/223.4 |
| 4,758,012 A | * | 7/1988 | Ogura et al. ................. 180/409 |
| 4,865,143 A | * | 9/1989 | Hashimoto et al. ......... 452/130 |
| 5,050,443 A | | 9/1991 | Stocker |
| 6,474,688 B1 | * | 11/2002 | Bogren et al. .............. 280/771 |

FOREIGN PATENT DOCUMENTS

| DE | 3041259 A | * | 5/1982 | ............ B62D/1/26 |
| DE | 195 10 717 | | 9/1996 | |
| JP | 62181960 A | * | 8/1987 | ............ B62D/7/14 |

* cited by examiner

Primary Examiner—Chong H. Kim
(74) Attorney, Agent, or Firm—Smith, Gambrell & Russell

(57) ABSTRACT

The invention concerns a neutral point setting device for the rotating ring of a roller bearing (5) provided with an inner ring (6) and an outer ring (7), one of the rings being integral with a fixed element (9) and the other ring being integral with a rotating element (1). The return device comprises springs designed to apply a return torque on the rotating ring to return it to the neutral point and means for limiting in two directions the rotation of the rotating ring. The device comprises a plate (19) mounted rotatable relative to the fixed element and two helical springs, a first spring (23) being arranged on one side of the plate (19) and fixed thereon by its internal end, a second spring (25) being arranged on the other side of the plate (19) and fixed by its internal end on the fixed element, the external end of the first spring (23) being linked, in a first direction, to the rotation of the rotating ring and the external end of the second spring (25) being linked, in a second direction opposite to the first, to the rotation of the plate (19), said device having a diameter not greater than the bore of the inner ring.

14 Claims, 1 Drawing Sheet

NEUTRAL POINT SETTING FOR STEERING WHEEL IN PARTICULAR

The present invention relates to the field of steering wheel devices used, purely by way of example, for steering motor vehicles, handling plant, or civil engineering works vehicles or any other type of vehicle requiring a control handwheel.

Conventionally, a steering wheel is connected to a shaft, for example a steering column, which, depending on the type of steering used, directly turns the steering mechanism in the case of mechanical steering, distributors in the case of hydraulic steering, or, finally, in the case of electric steering, actuates the coder ring of a sensor device delivering a signal to the electric operating motor, combinations of these three types being possible.

In the case of purely electric steering, used increasingly commonly in handling plant such as forklift trucks, the shaft is used to connect the steering wheel to the vehicle via rolling bearings. A system for detecting the turning of the wheel, which may or may not be incorporated into the bearing, delivers a signal that represents the turning of the wheel intended for the device for guiding the roadwheels of the vehicle. Added to this is generally a system for braking the steering wheel which is intended to generate therein a resistive torque so as to enhance the accuracy with which the vehicle can be steered. A device of this type is described in document DE-A-195 10 717.

Although technically satisfactory, this device has certain disadvantages of axial bulk and of cost because of the presence of two bearings, of a braking system and of the wheel itself.

Given that the wheel no longer has any direct mechanical link with the members it is controlling, for example the roadwheels, there are two types of problem that need to be solved: on the one hand, that of limiting the number of possible revolutions performed by the wheel and, on the other hand, that of automatically returning the wheel to the neutral point when the operator stops turning the wheel.

Devices for returning to the neutral point already exist (see, in particular, documents U.S. Pat. No. 5,050,443, NO 101790), but these are designed for systems controlled by a central shaft, which is precisely what we are looking to avoid. In addition, these devices have a great many parts and are therefore expensive to manufacture.

It is an object of the present invention to overcome the abovementioned drawbacks.

An object of the present invention is to propose a simple and compact mechanism for returning to the neutral point, suited to a steering wheel that has no central shaft.

The device according to the invention is used for returning to the neutral point the rotating race of a rolling bearing provided with an inner race and with an outer race, one of the races being secured to a fixed element and the other race being secured to a rotating element. The device is of the type comprising springs intended to apply a return torque to the rotating race so as to return it to the neutral point and means for limiting, in both directions, the rotation of the rotating race. The device comprises a plate mounted so that it can rotate with respect to the fixed element and two spiral springs, a first spring being arranged on one side of the plate and fixed to the latter by its inner end, a second spring being arranged on the other side of the plate and fixed by its inner end to the fixed element, the outer end of the first spring being connected, in a first direction, to the rotation of the rotating race, and the outer end of the second spring being connected, in a second direction opposite to the first, to the rotation of the plate.

Advantageously, said device is of a diameter smaller than or equal to the size of the rolling bearing, possibly smaller than or equal to the bore of the inner race of the bearing.

Advantageously, the device comprises first means for driving the outer end of the first spring, the first drive means being secured to the rotating race, and second means for driving the outer end of the second spring, the second drive means being secured to the plate.

Advantageously, the device comprises a drive member secured to the rotating race and intended to drive the plate in a first direction of rotation by direct contact with a bearing member of said plate, the bearing member also forming a stop for stopping the rotation of the rotating race after approximately one revolution in the second direction from the neutral point.

In one embodiment of the invention, the means for driving the first spring consist of the drive member secured to the rotating race. The drive member secured to the rotating race may be a radial lug.

In another embodiment of the invention, the means of driving the first spring consist of a hole in which the outer end of the spring becomes lodged.

Advantageously, the plate comprises, on the same side as the second spring, a stop member intended to collaborate with a stop of the fixed element so as to limit to approximately one revolution the rotation of the plate when said plate is driven in the first direction of rotation and to prevent said plate from rotating from the neutral point in the second direction of rotation.

In one embodiment of the invention, the means of driving the second spring which are secured to the plate consist of the stop member situated on the plate. The stop member situated on the plate may be an axial lug.

In one embodiment of the invention, the anchoring point for the inner end of the second spring is on a fixed pin secured to the fixed member.

As a preference, the rotating of the rotating race in the first direction causes the plate to rotate and causes the second spring to become stressed by winding up without the first spring undergoing any change in stress, while rotating the rotating race in the second direction causes the first spring to become stressed by winding up without the second spring undergoing any change in stress, the plate being prevented from rotating by the stop member coming to bear against the stop of the fixed element.

In one embodiment of the invention, the second spring is arranged axially between said plate and the fixed element.

Another subject of the invention is a system involving a wheel, of the shaftless type, fixed to the rotating race of a rolling bearing equipped with a device for returning to the neutral point.

The steering wheel device with return to the neutral point is particularly axially compact by comparison with the conventional device. In addition, as the rolling bearing may have a large diameter, greater than the diameters conventionally used, while at the same time remaining smaller than the diameter of the wheel, and therefore without increasing the radial bulk, it is possible to use a high-resolution sensor, the number of pulses delivered by the encoder for a given angle of rotation being higher than for an encoder of small diameter.

The large diameter of the bearing makes it easier for a simple system that generates a braking torque to be incorporated into it, the braking force required by the generating system being inversely proportional to the diameter for a given torque.

The central zone of the wheel which is free of solid shaft offers an empty space that can be used to house auxiliary devices.

Finally, this steering wheel device can be adapted to and easily mounted at numerous possible sites on the vehicle, for example on the dashboard, via the housing that forms the support. Just a few screws are enough to secure the steering wheel via the housing.

The present invention will be better understood and other advantages will become apparent from reading the detailed description of one embodiment taken by way of entirely nonlimiting example and illustrated in the appended drawings, in which.

Figure 1:
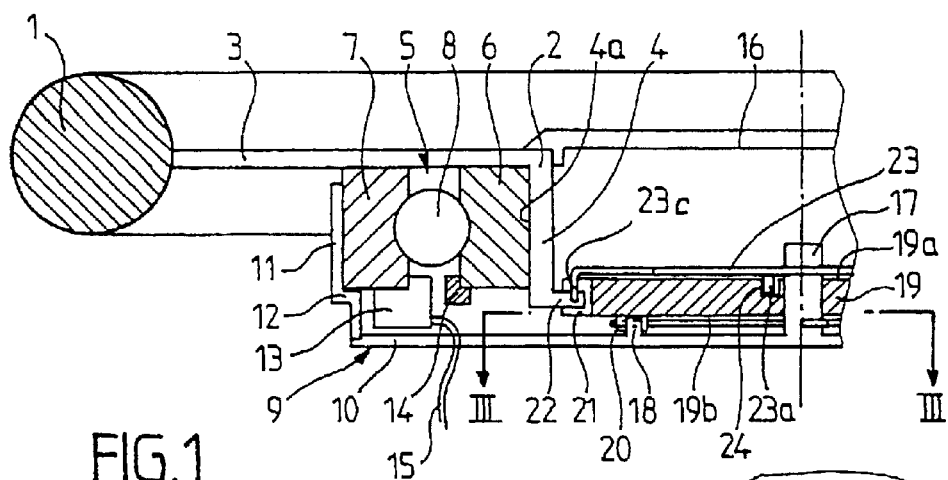
FIG. 1 is a half view in axial section of a steering wheel device according to the invention.

As can be seen in FIG. 1, the steering wheel comprises a part 1 for holding, in the form of a torus, secured to a support part 2. The support part 2 has the shape of a cup with a radial part 3 the large-diameter free end of which supports the part 1 for holding, and an axial part 4 which extends downward from the inner edge of the radial part 3.

The steering wheel comprises a rolling bearing 5 equipped with a solid rotating inner race 6, with a solid non-rotating outer race 7 and with a row of rolling elements 8, for example balls, arranged between an external raceway of the inner race 6 and an internal raceway of the outer race 7.

A cage could be provided for holding the rolling elements 8. However, because of their low rotational speed in such applications, the presence of the cage is not essential. The inner race 6 is pushed onto the exterior surface 4a of the axial part 4 of the support part 2 until it comes into contact with the radial part 3. As an alternative, sheet metal races could be provided.

The wheel also comprises a fixed support housing referenced 9. The housing 9 has a circular radial end 10 which may be pierced with through-holes designed to take screws for fixing to the part designed to support the wheel, for example the dashboard of a vehicle or of a piece of plant. The housing 9 also comprises an axial part 11, in the bore of which the outer race 7 of the bearing 5 is fitted. The axial part 11 extends upward from the outer circular edge of the radial end 10 of the housing 9. To allow satisfactory positioning of the outer race 7 with respect to the axial part 11, a step 12 is provided, against which step said outer race 7 abuts in the axial direction.

The rolling bearing 5 comprises a built-in device for detecting the rotational speed, this device being equipped with a sensor 13 secured to the outer race 7 and with an encoder ring 14 secured to the inner race 6. This device for detecting the rotational speed may be of various types, optical, magnetic, with a Hall-effect or other sensor, etc. The sensor 13 and the encoder 14 are arranged axially between the rolling elements 8 and the radial end 10 of the housing 9 and are therefore relatively well protected against external attack, the radial part 3 covering the top of the rolling bearing 5.

A connecting cable 15 connects the sensor 13 to the electronic unit, not depicted, capable of using the electric signal carrying information about the angular orientation of the wheel from said sensor 13. The cable 15 passes through the end 10 of the housing.

The steering wheel also comprises a cap 16 made, for example, of synthetic material, and which fits onto the support part 2 where the radial 3 and axial 4 parts meet, on the opposite side to the exterior surface 4a. This cap 16 is in the shape of a circular disk or, as an alternative which has not been depicted, of a circular annulus which leaves an empty central space near the geometric axis of rotation of the wheel.

The end 10 of the housing 9 comprises an axial finger 17 forming a pin centered on the geometric axis of rotation of the wheel and projecting upward from said end 10, and a stop 18 in the form of an axial peg also projecting upward and arranged radially between the axial part 4 of the support part 2 and the finger 17, being closer to the axial part 4. Mounted to rotate on the finger 17 is a plate 19 of flat circular overall shape and with a diameter slightly smaller than that of the axial part 4 of the support part 2 which surrounds the plate 19 over at least part of its thickness. The plate 19 has a flat upper surface 19a and a lower surface 19b which is also flat. The lower surface 19b is situated above the stop 18 and is equipped with an axial lug 20 directed downward and situated radially some distance from the axis of rotation such that said axial lug 20 is capable of coming into contact with the stop 18 as the plate 19 rotates. The plate 19 is provided with a radial projection 21 capable of coming into contact with a radial lug 22 that stands out from the free lower edge of the axial part 4 of the support part 2 and is directed radially inward.

Figure 2:
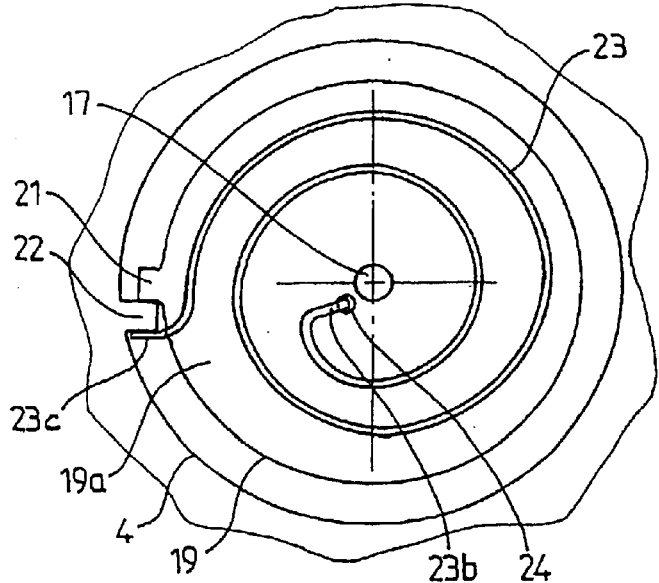
FIG. 2 is a part elevation, from above, corresponding to FIG. 1.
Figure 3:
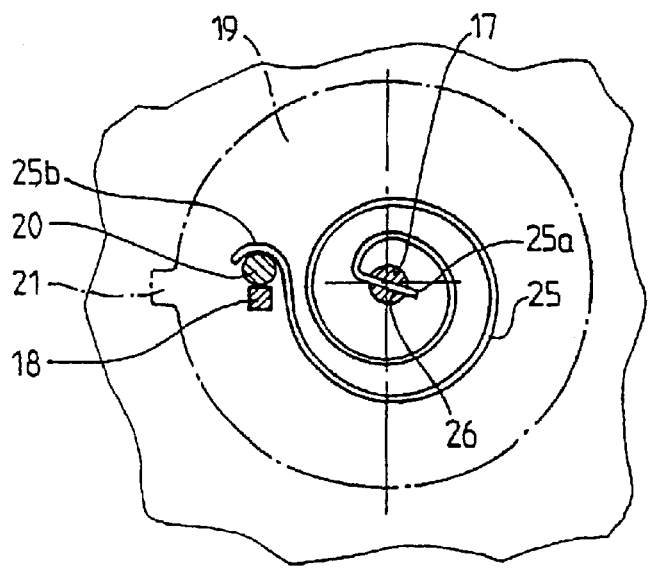
FIG. 3 is a view in section on III—III of FIG. 1.

In the positions illustrated in FIGS. 1, 2 and 3, the projection 21 is in contact with the radial lug 22, and the axial lug 20 is in contact with the stop 18. Starting from this position, it will be understood that it is possible to turn the wheel 1 in the clockwise direction over roughly one revolution, driving the rotation of the plate 19 until the lug 20 of said plate 19 comes into contact with the stop 18. In the counterclockwise direction, it is also possible to turn the wheel 1 through roughly one revolution without driving the plate 19, until the radial lug 22 comes into contact with the projection 21 of the plate 19 the axial lug 20 of which is still in contact with the stop 18 of the housing 9.

The device furthermore comprises two springs. An upper spring 23 of spiral type is arranged on the upper surface 19a of the plate 19. The spring 23 has an inner end 23a bent axially downward and arranged in a hole 24 formed in said upper surface 19a of the plate 19. A roughly straight portion 23b situated before the bent end 23a is secured to the plate by appropriate means so that it is angularly connected to the rotation of the plate. The spring 23 has an outer end 23c which projects radially from the plate 19 and is in contact with the radial lug 22 of the wheel.

The second spring 25 is arranged on the lower surface 19b of the plate 19. The spring 25 is of spiral type and has a small-diameter end arranged in a transverse hole 26 in the axial finger 17, and a large-diameter end 25b in contact with the axial lug 20 of the plate 19 on the opposite side to the stop 18, in the position illustrated in FIGS. 1 to 3.

Starting out from the neutral position of FIGS. 1 to 3, if the wheel is turned in the clockwise direction, the radial lug 22 of the wheel drives the rotation of the plate 19 via the radial projection 21. The spring 23 does not therefore experience any modification and remains with the slight preload to which it was subjected when it was fitted. By contrast, the axial lug 20 of the plate 19 is no longer in contact with the stop 18 and drives the rotation, in the clockwise direction, of the outer end 25b of the spring 25, the inner end 25a of which is fixed in the transverse hole 26 in the finger 17 of the housing 9. The spring 25 is therefore gradually tensioned until rotation is halted, either by the operator or by contact between the axial lug 20 (or, as appropriate, the end 25b of the spring 25) and the stop 18 after roughly one revolution.

When the operator releases the wheel, the spring 25 relaxes and drives the axial lug 20, and therefore the plate 19, in the counterclockwise direction until it returns to the position illustrated in FIG. 3. This movement of the plate 19 in the counterclockwise direction also causes a corresponding movement of the wheel in the same direction because of the contact between the radial protrusion 21 and the radial lug 22 of the wheel.

Starting out from the neutral position illustrated in FIGS. 1 to 3, when an operator drives the wheel in rotation in the counterclockwise direction, the radial lug 22 of the wheel drives the rotation, in said counterclockwise direction, of the outer end 23c of the upper spring 23. The plate 19 also tends to move in the counterclockwise direction but is impeded by contact of the axial lug 20 with the stop 18 of the housing 9. The plate 19 therefore remains motionless and the spring 23 becomes tensioned. In the counterclockwise direction, the maximum rotation is restricted to roughly one revolution, when the radial lug 22 (or, as appropriate, the end 23c of the spring 23) comes into contact with the protrusion 21 of the plate 19.

When the operator releases the wheel, the spring 23 relaxes gradually, driving the radial lug 22 and therefore the wheel in the clockwise direction, the plate 19 remaining motionless, its axial lug 20 being in contact with the stop 18 of the housing 9, as can be seen in FIG. 3. The spring 23 therefore tends to return the wheel to the position illustrated in FIGS. 1 to 3.

In other words, turning the wheel in one direction causes the plate to rotate and one of the springs to become stressed by winding up without the other spring undergoing any change in stress, while rotating the wheel in the other direction causes the other spring to become stressed by winding up without the first spring undergoing any change in stress, the plate being prevented from turning.

The radial lug 22 is therefore capable of driving the plate 19 in rotation in one direction, of compressing the spring 23 during rotation in the other direction, and of coming into end-of-travel abutment with the radial protrusion 21 of the plate 19, still in the other direction.

The axial lug 20 situated under the lower surface 19b of the plate 19 is capable of driving the outer end 25b of the lower spring 25, compressing it in one direction until there is end-of-travel abutment against the stop 18 of the housing 9 and, in the other direction, of remaining bearing against said stop 18.

The springs 23 and 25 are mounted in opposition and are slightly preloaded so that, in the neutral position, the radial lug 22 of the wheel bears lightly against the radial protrusion 21 of the plate 19 and so that the axial lug 20 of the, plate 19 itself bears lightly against the stop 18 of the housing 9. The wheel is therefore in a position of equilibrium at the neutral point. Thus, whatever the direction of rotation starting from the neutral point, if the operator releases the wheel, the spring which has been compressed restores energy by relaxing and returns the wheel to the neutral point. The wheel can make practically one revolution in each direction and return automatically to the neutral point.

Of course, this embodiment is nonlimiting. It would also be possible to obtain the same results by driving the large-diameter ends of the springs using means other than the lugs or than the radial and axial protrusions, for example by introducing the outer end of the upper spring into a radial hole made in the rotating member, for example in the axial part 4 and by securing the outer end of the lower spring to the end 10 of the housing 9. The relative positions of various elements may be reversed without altering the operation of the device, this being done by way of variation.

By virtue of the invention, there is obtained a very simple and compact assembly for returning a wheel to the neutral point and for limiting the number of revolutions thereof, which assembly can be arranged in the central part of a shaftless wheel, the radial bulk of the device for returning to the neutral point allowing it to be mounted in the empty radial space inside the wheel and inside the rolling bearing, the axial bulk of the device for returning to the neutral point itself being less than the axial bulk of the rolling bearing. The axial bulk of the device for returning to the neutral point is small enough to leave an empty space under the cap 16 and allow auxiliary components to be installed.

By virtue of the invention, there is available a steering wheel which is economical, small in axial and in radial bulk, and which at the same time leaves an empty central space and uses just one rolling bearing itself equipped with a single row of rolling elements.

What is claimed is:

1. Device for returning to a neutral point a rotating race of a rolling bearing provided with an inner race and with an outer race, one of the races being secured to a fixed element and the other race being secured to a rotating element, the return device comprising springs intended to apply a return torque to the rotating race so as to return said race to the neutral point and means for limiting, in both directions, the rotation of the rotating race, and a plate mounted so that said plate can rotate with respect to the fixed element, said springs comprising two spiral springs, a first spring having an inner and an outer end and being arranged on one side of the plate, the inner end of said first spring being fixed to said plate, a second spring being arranged on an other side of the plate, the inner end of said second spring being fixed to the fixed element, the outer end of the first spring being connected, in a first direction, to the rotation of the rotating race, and the outer end of the second spring being connected, in a second direction opposite to the first, to the rotation of the plate.

2. Device according to claim 1, comprising first means for driving the outer end of the first spring, the first drive means being secured to the rotating race, and second means for driving the outer end of the second spring, the second drive means being secured to the plate.

3. Device according to claim 1, comprising a drive member secured to the rotating race and intended to drive the plate in the first direction of rotation by direct contact with a bearing member of said plate, the bearing member also forming a stop for stopping the rotation of the rotating race after approximately one revolution in the second direction from the neutral point.

4. Device according to claim 2, wherein the means for driving the first spring comprises a drive member secured to the rotating race.

5. Device according to claim 4, wherein the drive member secured to the rotating race is a radial lug.

6. Device according to claim 1, wherein the plate comprises, on the same side as the second spring, a stop member intended to collaborate with a stop of the fixed element so as to limit to approximately one revolution the rotation of the plate when said plate is driven in the first direction of rotation and to prevent said plate from rotating from the neutral point in the second direction of rotation.

7. Device according to claim 6, wherein the means of driving the second spring which is secured to the plate comprises the stop member situated on the plate.

8. Device according to claim 7, wherein the stop member situated on the plate is an axial lug.

9. Device according to claim 1, wherein an anchoring point for the inner end of the second spring is on a fixed pin secured to the fixed member.

10. Device according to claim 1, wherein the rotating of the rotating race in the first direction causes the plate to rotate and causes the second spring to become stressed by winding up without the first spring undergoing any change in stress, while rotating the rotating race in the second direction causes the first spring to become stressed by winding up without the second spring undergoing any change in stress, the plate being prevented from rotating by the stop member coming to bear against the stop of the fixed element.

11. Device according to claim 1, wherein the second spring is arranged axially between said plate and the fixed element.

12. Shaftless wheel fixed to the rotating race of a rolling bearing equipped with a device for returning to a neutral point a rotating race of a rolling bearing provided with an inner race and with an outer race, one of the races being secured to a fixed element and the other race being secured to a rotating element, the return device comprising springs intended to apply a return torque to the rotating race so as to return said race to the neutral point and means for limiting, in both directions, the rotation of the rotating race, and a plate mounted so that said plate can rotate with respect to the fixed element, said springs comprising two spiral springs, a first spring having an inner end and an outer end and being arranged on one side of the plate, the inner end of said first spring being fixed to said plate, a second spring being arranged on an other side of the plate, the inner end of said second spring being a fixed element, the outer end of the first spring being connected, in a first direction, to the rotation of the rotating race, and the outer end of the second spring being connected, in a second direction opposite to the first, to the rotation of the plate.

13. Shaftless wheel according to claim 12, wherein the rolling bearing is equipped with a device for detecting rotation parameters.

14. Device according to claim 2, wherein the means of driving the second spring comprises an axial lug situated on the plate.

\* \* \* \* \*